United States Patent
Yun et al.

(10) Patent No.: US 11,310,539 B1
(45) Date of Patent: Apr. 19, 2022

(54) GROUPING A FIRST SET OF VIDEO ITEMS TO EFFICIENTLY MATCH AGAINST A SECOND SET OF VIDEO ITEMS USING EMBEDDING SIMILARITY

(71) Applicant: Microsoft Technology Licensing, LLC, Redmond, WA (US)

(72) Inventors: Young Jin Yun, San Francisco, CA (US); Sneha Chaudhari, Santa Clara, CA (US); Mahesh Subhash Joshi, Belmont, CA (US); Fares Hedayati, Richmond, CA (US); Gungor Polatkan, San Jose, CA (US); Gautam Borooah, Oakland, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/189,029

(22) Filed: Mar. 1, 2021

(51) Int. Cl.
  *H04N 21/234* (2011.01)
  *H04N 21/25* (2011.01)
  *H04N 21/466* (2011.01)
  *G06V 20/40* (2022.01)

(52) U.S. Cl.
  CPC ....... *H04N 21/23418* (2013.01); *G06V 20/41* (2022.01); *G06V 20/48* (2022.01); *H04N 21/251* (2013.01); *H04N 21/4668* (2013.01)

(58) Field of Classification Search
  CPC ........... H04N 21/23418; H04N 21/251; H04N 21/25; H04N 21/4668; H04N 21/45; H04N 21/466; H04N 21/4662; G06V 20/41; G06V 20/48
  See application file for complete search history.

(56) References Cited

U.S. PATENT DOCUMENTS

| | | | | |
|---|---|---|---|---|
| 10,860,860 | B1* | 12/2020 | Huynh | H04N 21/84 |
| 10,986,408 | B1* | 4/2021 | Randhawa | G06N 3/08 |
| 11,200,240 | B2* | 12/2021 | Ghoshal | G06K 9/6267 |
| 2011/0154399 | A1* | 6/2011 | Jin | H04N 21/466 725/46 |
| 2015/0100987 | A1* | 4/2015 | Whitman | G06F 16/7867 725/53 |
| 2018/0144052 | A1* | 5/2018 | Sayyadi-Harikandehei | G06F 7/026 |

OTHER PUBLICATIONS

"Clustering", Retrieved from: https://spark.apache.org/docs/latest/ml-clustering.html, Retrieved Date: Jan. 6, 2021, 6 Pages.

(Continued)

*Primary Examiner* — Nnenna N Ekpo
(74) *Attorney, Agent, or Firm* — Nicholson De Vos Webster & Elliott LLP

(57) ABSTRACT

Techniques for efficiently matching two sets of video items are provided. In on technique, an embedding is generated for each video item in each set. For the first set of video items, multiple groups are generated. The first set of video items may have a relatively little amount of metadata information for them. Each video item in the first set is assigned to one of the groups. Then, for each video item in the second set, one of the groups is selected based on embedding similarity. For each video item in the selected group, an embedding similarity is determined between that video item in the selected group and the video item in the second set. If the embedding similarity is above a certain threshold, then an association is generated for that pair of video items.

18 Claims, 4 Drawing Sheets

(56) References Cited

OTHER PUBLICATIONS

"Clustering into Same Size Clusters", Retrieved from: http://jmonlong.github.io/Hippocamplus/2018/06/09/cluster-same-size/, Jun. 9, 2018, 9 Pages.
"Extracting, Transforming and Selecting Features", Retrieved from: https://spark.apache.org/docs/2.2.3/ml-features.html#lsh-operations. Retrieved Date: Jan. 6, 2021, 38 Pages.
"K-Means Advantages and Disadvantages", Retrieved from: https://developers.google.com/machine-learning/clustering/algorithm/advantages-disadvantages, Retrieved Date: Jan. 6, 2021, 5 Pages.
"K-Means Algorithm Variation with Equal Cluster Size", Retrieved from: http://web.archive.org/web/20201013182936/https://stackoverflow.com/questions/5452576/k-means-algorithm-variation-with-equal-cluster-size, Oct. 13, 2020, 11 Pages.
"Locality-Sensitive Hashing", Retrieved from: https://en.wikipedia.org/wiki/Locality-sensitive_hashing, Retrieved Date Jan. 6, 2021, 9 Pages.
"Same-Size k-Means Variation", Retrieved from: https://elki-project.github.io/tutorial/same-size_k_means, Retrieved Date: Jan. 6, 2021, 17 Pages.
"Universal-Sentence-Encoder-Large v4", Retrieved from: https://tfhub.dev/google/universal-sentence-encoder-large/4, Retrieved Date: Jan. 6, 2021, 5 Pages.
"Universal-Sentence-Encoder-Large v5", Retrieved from: https://tfhub.dev/google/universal-sentence-encoder-large/5, Retrieved Date: Jan. 6, 2021, 5 Pages.
"Universal-Sentence-Encoder-Multilingual-Large v3", Retrieved from: https://tfhub.dev/google/universal-sentence-ancoder-multilingual-large/3. Retrieved Date: Jan. 6, 2021, 7 Pages.
Ni, et al., "Detecting Abuse at Scale: Locality Sensitive Hashing at Uber Engineering", Retrieved from: https://databricks.com/blog/2017/05/09/detecting-abuse-scale-locality-sensitive-hashing-uber-engineering.html, May 9, 2017, 11 Pages.
Sankaranarayanan, et al., "A Fast All Nearest Neighbor Algorithm for Applications Involving Large Point-Clouds", In Journal of Computers & Graphics, vol. 31, Issue 2, Apr. 2007, pp. 157-174.

\* cited by examiner

GROUPING A FIRST SET OF VIDEO ITEMS TO EFFICIENTLY MATCH AGAINST A SECOND SET OF VIDEO ITEMS USING EMBEDDING SIMILARITY

TECHNICAL FIELD

The present disclosure relates to machine-learned embeddings and, more particularly to, efficiently matching two large groups of video items based on machine-learned embeddings.

BACKGROUND

Some video distribution platforms host a significant number of videos, or video items. End users, operating their respective computing devices, connect to video distribution platforms to access video content on demand. However, the quantity of the video items makes it difficult for users to efficiently find relevant video items. Some video distribution platforms include systems for identifying potentially relevant video content for specific end users. Such systems may take into account a history of which users interacted with which video items in order to better identify relevant video content for the same or other users.

However, some video items have little to no viewing history, such as new video items or video items that are transferred to a video distribution platform from a third-party source. Thus, factors that take into account viewing history (e.g., who viewed a video item) cannot be used to determine whether such video items might be relevant to end users. Without those factors, it is difficult to accurately predict whether an end user will view a third-party video item if information about that video item is presented to an end user. There are currently no known techniques for efficiently ingesting a significant quantity of third-party video items into a video distribution platform and determining their relevance for end users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for efficiently matching first-party video items to third-party video items are provided. In one technique, an embedding is generated for each first-party video item and each third-party video item. The embedding for a video item may be generated using a neural network that accepts a set of textual tokens associated with the video as input. A grouping (or clustering) technique is used to assign each third-party video item to a different group based on their respective embedding. Each group is represented by a single embedding, such as an embedding that corresponds to a video item that represents the center of a multi-dimensional space defined by the embeddings in that group. After multiple groups are generated, each first-party video item is matched to each group by comparing the embedding of the first-party video item with the embedding of the group, or of the "center" video item of the group, to generate an embedding similarity score. The embedding of the first-party video item may then be compared with the embedding of each third-party video item in the group associated with the highest embedding similarity score.

In this way, the number of embedding similarity comparisons is drastically reduced. The greater the number of groups, the more savings (in terms of time and computing power) are realized. Therefore, embodiments improve computer-related technology by (1) increasing the speed with which matching third-party video items are identified and (2) decreasing the use of computing resources that would necessarily be required if a naïve search is performed.

System Overview

Figure 1:
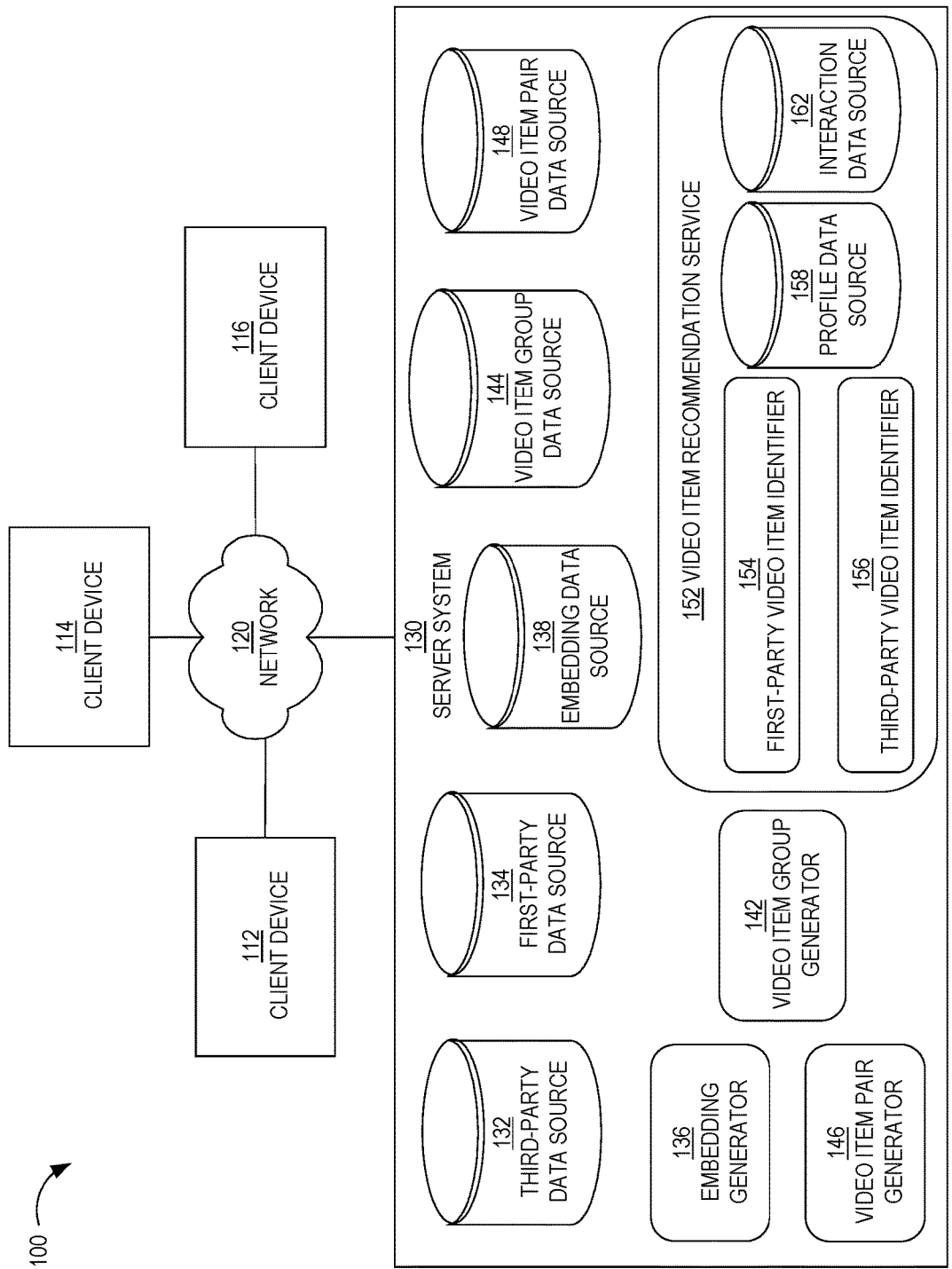
FIG. 1 is a block diagram that depicts an example system for efficiently matching third-party video items to first-party video items, in an embodiment.

FIG. 1 is a block diagram that depicts an example system 100 for efficiently matching third-party video items to first-party video items, in an embodiment. System 100 includes client devices 112-116, a network 120, and a server system 130. Although only three client devices are depicted, many client devices may be communicatively coupled to server system 130 through network 120 and/or other networks (not depicted). Server system 130 comprises one or more computing elements that perform the operations described herein as being performed by server system 130.

Network 120 is a computer network, examples of which include a local area network (LAN), a wide area network (WAN), and the Internet.

Examples of client devices 112-116 include a desktop computer, a laptop computer, a tablet computer, a wearable device, a video game console, and a smartphone.

A client device may receive content from server system 130 in response to transmitting a content request over network 120 to server system 130. Examples of a content request include a search request and a page request. A search request includes one or more query terms that are entered through the client device through one or more ways, such as through a physical keyboard of the client device or a graphical keyboard that is presented on a touchscreen display of client device 112. A page request includes a uniform resource locator (URL) that server system 130 hosts.

A client application executing on the client device transmits the content request to server system 130. Examples of such a client application include (1) a web application that executes within a web browser that executes on the client device and (2) a native application that is installed on the client device and is configured to communicate with server system 130.

A client device may receive content from server system 130 not in response to a content request from the client device. For example, server system 130 identifies content that server system 130 determines is relevant to a user of the client device and sends, to the client device or to an account of the user, a notification of the content in the form of an instant message, a text message, an email message, a push notification, or an in-app notification. Later, the user, operating the client device or another device, views the notification and determines whether to select any links to content found in the notification, the links referencing content hosted by server system 130 and/or another computer system.

Video Item

A video item is an item of video that contains video content that is playable by a video player on computing devices, such as client devices 112-116. A video player may be a standalone application that executes on a computing device or may execute within another application, such as a web application. A video item may also contain audio content and/or text content. The subject matter of the video content of a video item may vary greatly, such as user-generated video content (e.g., from an end-user's smartphone camera), an educational video produced by an organization (e.g., a company, academic institution, or other business entity), and a video for entertainment purposes only.

A video item may be associated with one or more metadata. Metadata may be textual and/or graphical. An icon is an example of graphical metadata. Example textual metadata include a title, a description, an industry name (e.g., Finance, Software Technology, Agriculture), a pre-defined category (e.g., Educational, Sports, Fashion, Politics, Viral), a length of the video item, a number of users who have viewed and/or requested the video item, a number of times the video item has been viewed and/or requested, a set of prerequisite skills that a user is recommended to need to understand content of the video item, and a set of acquirable skills that a user is to gain by viewing the video content of the video item.

Server System

Server system 130 includes a first-party data source 132, a third-party data source 134, an embedding generator 136, embedding data source 138, a video item group generator 142, a video item group data source 144, a video item pair generator 146, a video item pair data source 148, a video item recommendation service 152, a first-party video item identifier 154, a third-party video item identifier 156, a profile data source 158, and an interaction data source 162. Each of computing elements 136, 142, 146, and 152-154 is implemented in software, hardware, or a combination of software and software. Also, two or more of computing elements 136, 142, 146, and 152-154 may be implemented in one or more programs or services. For example, the functionality of video item group generator 142 and of video item pair generator 146 may be implemented in the same program. Similarly, data sources 132, 134, 138, 144, 148, 158, and 162 may reside on the same storage or on different storages relative to each other, such as volatile storage (e.g., main memory) or non-volatile storage. For example, embedding data source 138 may reside on a different storage device than video item pair data source 148. Also, a data source may reside on the same device upon which a computing element executes. For example, the video item group data source 144 may reside in memory of the same device upon which video item pair generator 146 executes. Examples of non-volatile storage include a relational database, an object-relational database, and a key-value store.

First-party data source 132 contains first-party video items. A first-party video item is a video item that is "known" to the party or entity that owns and/or operates server system 130, such as LinkedIn. A video item is "known" if server system 130 has access to high quality metadata of the video item, such as certain attributes of the video item, examples of which include an industry associated with the corresponding video item, a set of skills associated with the corresponding video item, a pre-defined category of information, and historical user interaction data associated with the corresponding video item, such as likes of the item, shares of the item, comments on the item, and saved the item for later viewing. High quality metadata attributes are typically difficult to add programmatically.

Third-party data source 134 contains third-party video items. The number of video items in data source 134 may be an order of magnitude greater than the number of video items in data source 132. For example, data source 132 may contain ten thousand video items while data source may contain one hundred thousand video items. A third-party video item is a video item that is not known to the party or entity that owns and/or operates server system 130. A video item is not known if server system 130 does not have access to certain attributes of the video item. For example, a third-party video item may have less than half of the metadata attributes that a typical or average first-party video item has. Therefore, the ability to leverage one or more machine-learned models (that have trained for first-party video items) for third-party video items may not be possible due to the lack of metadata attribute values that would be required to generate input to the machine-learned model(s). As depicted in FIG. 1, third-party video items may be stored separately (e.g., in a different logical location or a different physical location, such as a different storage device) from first-party video items.

In addition to storing the content of each video item, data sources 132-134 may include, for each video item stored therein, a video item identifier that uniquely identifies the video item relative to all other video items in data source 132 and/or data source 134. Data sources 132-134 may also include metadata associated with the video item.

Embedding Generator

Embedding generator 136 generates an embedding for a video item based on one or more text portions (e.g., from metadata) associated with the video item and stores the embedding in embedding data source 138. Example text portions include a title of the video item and a description of the video item. An embedding is a sequence of real values, such as two hundred and fifty, each value corresponding to a different dimension. Embedding generator 136 may comprise a neural network that has been trained on a corpus of text data. An example of embedding generator 136 is one that is based on Universal Sentence Encoder (USE), which encodes a set of text into a high-dimensional vector that can be used for text classification, semantic similarity, clustering, and other natural language tasks.

A USE model is trained and optimized for greater-than-word length text, such as sentences, phrases, or short paragraphs. The USE model may be trained on a variety of data sources and a variety of tasks with the aim of dynamically accommodating a wide variety of natural language understanding tasks. The input to the USE model is a variable length English text and the output is a 512-dimensional vector. The USE model is trained with a deep averaging network (DAN) encoder.

Another example of embedding generator 136 is a BERT encoder. BERT (Bidirectional Encoder Representations from Transformers) is a Transformer-based machine learning technique for natural language processing (NLP) pre-training. Unlike previous models, BERT is a bidirectional, unsupervised language representation, pre-trained using a plain text corpus. Context-free models (such as word2vec) generate a single word embedding representation for each word in a vocabulary, whereas BERT takes into account the context for each occurrence of a given word. For instance, whereas the vector for "running" will have the same word2vec vector representation for both of its occurrences in the sentences "He is running a company" and "He is running a marathon," BERT will provide a contextualized embedding that will be different according to the sentence. A phrase/sentence embedding may be generated using a BERT encoder.

Embedding data source 138 associates an embedding (generated by embedding generator 136) with the video item from which the embedding was generated. For example, embedding data source 138 may be a key-value data store, where the key is a video item identifier and the value is the embedding of that video item. Embedding data source 138 may reside in the same or different storage devices upon which data sources 132 and 134 reside. For example, each of data sources 132-134 includes an embedding (generated by embedding generator 136) that is stored in association with the corresponding video item. Thus, given a video item identifier, a process may locate not only the video item itself, but also its metadata and one or more embeddings. As described in more detail herein, a video item may be associated with multiple embeddings, each generated based on different text portions of the video item.

Video Item Group Generator

Video item group generator 142 generates multiple groups of video items from third-party video items. Video item group generator 142 assigns each video item to one of the groups based on its embedding. Thus, video item group generator 142 uses the embedding of each video item from third-party data source 132 to generate the groups. Also, each group comprises multiple video items. Each group may be associated with a "center" video item or "centroid" that represents the center of the group. The "center" of a group is the center of the multi-dimensional space defined by the video items assigned to the group. The center may correspond to a specific video item in the group or may be an aggregated embedding that is based on aggregating multiple embeddings of video items in the group, such as generating a mean or median embedding that involves computing the mean or median of each dimension of the multiple embeddings.

Video item group generator 142 may implement one or more grouping techniques to generate the multiple groups. Examples of grouping techniques include k-means clustering and locality sensitive hashing (LSH). K-means clustering is a method of vector quantization, originally from signal processing, that aims to partition n observations into k clusters, where each observation belongs to the cluster with the nearest mean (cluster centers or cluster centroid), serving as a prototype of the cluster. This results in a partitioning of the data space into Voronoi cells. The value of k may be specified by an administrator of server system 130. Different values of k may be tested to determine which value of k results in the highest performance, which may be measured based on one or more measures, such as user selection rate of presented third-party video items, number and type of downstream interactions with server system 130 after presentation of the third-party video items, and/or time to generate mappings of first-party video items to third-party video items.

LSH is an algorithmic technique that hashes similar input items into the same "buckets" or groups with high probability. The number of buckets is much smaller than the number of possible input items.

Video item group generator 142 stores the groups and the video item assignment to groups in video item group data source 144. Video item group data source 144 may reside in volatile memory. Additionally or alternatively, video item group data source 144 resides in non-volatile storage, such as a relational database or a key-value store.

Video Item Pair Generator

Video item pair generator 146 takes, as input, an embedding (e.g., from embedding data source 138) of a video item and compares that embedding to the embedding (e.g., from video item group data source 144) of the center (or "centroid") of each group generated by video item group generator 142. Video item pair generator 146 may implement one or more techniques for generating a similarity measure or score. An example of embedding similarity include cosine similarity; however, embodiments are not limited to any technique for determining the similarity between two video items.

Given an input embedding of a video item, the group with the centroid associated with the highest score is selected for further searching. The input video item is then compared to each video item in the selected group. Such a comparison may involve comparing corresponding embeddings using cosine similarity or any other embedding comparison technique.

If the similarity measure of an input video item (e.g., from first-party data source 134) relative to a video item in a selected group is higher than a certain threshold, then the video item pair is considered similar to each other. Video item pair generator 146 generates a mapping or association that associates the input video item to the video item from the selected group. The mapping may include the similarity measure of the video item pair. This similarity measure may be used later in filtering and ranking third-party video item recommendations, as described in more detail herein.

For some input video items, video item pair generator 146 might not find any matching video item in a selected group while, for other input video items, video item pair generator 146 might identify multiple matching video items, in which case video item pair generator 146 generates multiple mappings or associations. For example, a single mapping may include a video item identifier (of an input video item) and a vector or array of zero or more video item identifiers of (of video items from a video item group generated by video item group generator 142.

Video item pair generator 146 stores mappings in video item pair data source 148. Examples of video item pair data source 148 include a key-value store and a relational database comprising one or more tables. In the former example, the key of each entry in the key-value store may be a video item identifier of an input video item (e.g., from first-party data source 132) and the value of each entry may be a vector of zero or more video item identifiers of video items (e.g., from third-party data source 134) to which the input video item matched. In the latter example, a table is generated where each row corresponds to a different mapping generated by video item pair generator 146 and where the table comprises two columns: one for the video identifier of the input video item and the other for a vector of video item identifiers of the video items to which the input video item matched.

Mapping Generating Process

Figure 2A:
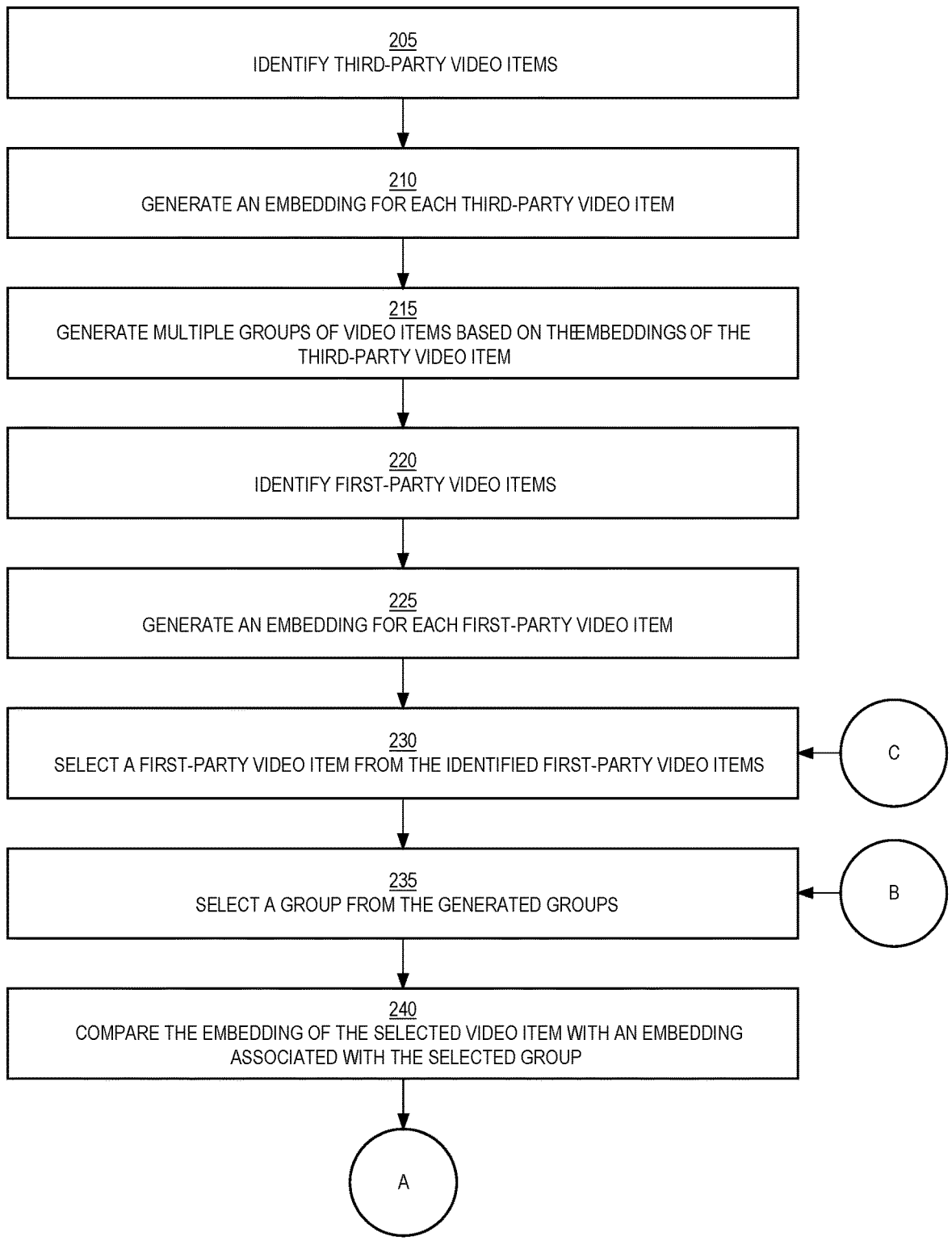
FIGS. 2A-2B are a flow diagram that depicts an example process for generating mappings between first-party video items and third-party video items, in an embodiment.
Figure 2B:
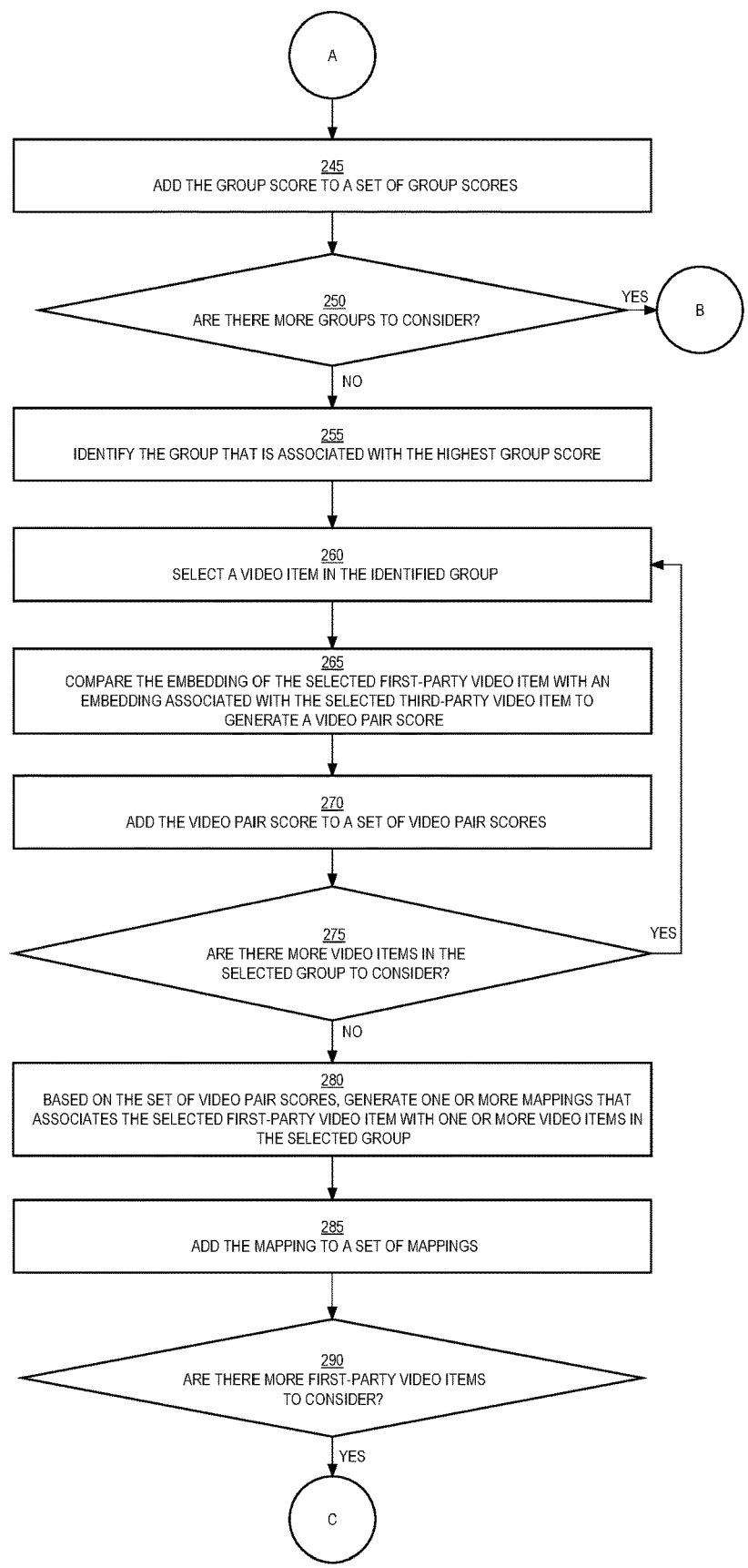

FIGS. 2A-2B are a flow diagram that depicts an example process 200 for generating mappings between first-party video items and third-party video items, in an embodiment. Different blocks of process 200 may be performed by different elements of server system 130.

At block 205, third-party video items are identified. Data about the third-party video items may be stored in third-party data source 132.

At block 210, an embedding is generated for each of the identified third-party video items. Blocks 205 and 210 may be performed by embedding generator 136.

At block 215, multiple groups of the third-party video items are generated based on the embeddings of the third-party video items. Block 215 may be performed by video item group generator 142 and the results generated from block 215 may be stored in video item group data source 144.

At block 220, first-party video items are identified. Data about the first-party video items may be stored in first-party data source 134.

At block 225, an embedding is generated for each of the identified first-party video items. Blocks 220 and 225 may be performed by embedding generator 136.

At block 230, a video item in the identified first-party video items is selected. The video item may be selected randomly. One criterion for selection is that this video item has not been selected in this iteration of process 200.

At block 235, a group in the multiple groups is selected.

At block 240, the embedding of the video item (selected in block 230) is compared with an embedding associated with the group (selected in block 235). A result of block 240 is a group score.

At block 245, the group score is added to a set of group scores, which is initially empty at the start of this iteration of block 230.

At block 250, it is determined whether there are any more groups that have not yet been considered for the video item (selected in the most recent iteration of block 230). If so, then process 200 returns to block 235. Otherwise, process 200 proceeds to block 255.

At block 255, the group that is associated with the highest group score in the set of group scores is identified. The set of group scores may then be reinitialized (or reset) to zero.

At block 260, a video item in the group identified in block 255 is selected. Block 260 may involve selecting from among the video items in the group at random. One criterion for selection is that this video item (a third-party video item) has not yet been selected before for the video item selected in block 230 (a first-party video item).

At block 265, the embedding of the first-party video item (i.e., selected in block 230) is compared with an embedding associated with the third-party video item (i.e., selected in block 260) to generate a video pair score.

At block 270, the video pair score is added to a set of video pair scores, which is initially empty at the start of this iteration of block 255.

At block 275, it is determined whether there are any more video items (i.e., third-party video items) in the group to select. (The selected video item should not have been considered yet for the first-party video item (selected in block 230).) If so, then process 200 returns to block 260 where another video item is selected. Otherwise, process 200 proceeds to block 280.

At block 280, based on the set of video pair scores, one or more mappings are generated that associate the first-party video item (i.e., selected in block 230) with one or more video items in the particular group. After block 280, the set of video pair scores may then be reinitialized (or reset) to zero.

At block 285, the mapping is added to a set of mappings. The set of mappings may be stored in video item pair data source 148.

At block 290, it is determined whether there are any more first-party video items to select. (The selected video item should not have been considered yet for this iteration of process 200.) If so, then process 200 returns to block 230. Otherwise, process 200 ends.

Blocks 230-290 may be performed by video item pair generator 146.

After process 200, the set of mappings are used to identify third-party video items that may be relevant to a user given a set of one or more first-party video items that are considered relevant to the user based on the former's similarity to the latter, as described in more detail herein.

Video Item Recommender Service

Video item recommender service 152 generates zero or more video item recommendations for each of one or more users of server system 130. A video item recommendation comprises visual (or presentable) data about a video item, such as a title of the video item, a description of the video item, and other metadata about the video item. A video item recommendation also comprises non-visual data (i.e., that is not displayed to an end-user), such as a video item identifier. A video item recommendation is presented on a screen or display of a client device (e.g., client device 112). A video item recommendation may be presented in a graphical user interface along with other (e.g., web) content. The user interface may include multiple video item recommendations.

Selection of a video item recommendation by a user of the client device (e.g., by touching an area of a screen occupied by the video item recommendation or by selecting that area with a cursor control device) causes a request to be transmitted over network 120 to server system 130, where the request includes a video item identifier of the video item represented by the recommendation. In response, server system 130 uses the video item identifier to lookup, in real-time, the video item in data storage (e.g., data source 132 or 134), retrieves content of that video item from the data storage, and transmits the content over network 120 to the client device. The content may include additional information about the video item and may include video content, in which case the video content may be presented in a video player executing on the client device, such as a video player that executes within a web browser executing on the client device.

Video item recommender service 152 may operate in an offline mode and/or an online mode. For example, video item recommender service 152 periodically (e.g., daily or weekly) and automatically identifies video item recommendations for each of one or more users, regardless of whether the users visit server system 130 through their respective client devices. The video item recommendations for a user may be presented on a client device of the user in response to (a) the user visiting server system 130 with his/her client device and/or (b) certain events, such as the passage of a certain period of time and online activity of the user, and/or relevance of the corresponding video items. For example, highly relevant (as determined by one or more software-implemented relevance scorers) video item recommendations for a user may be "pushed" to the user's client device (e.g., using push notifications or an in-app notification), while lesser relevant video items recommendation for a user are only displayed if the user visits server system 130 or a certain set of one or more webpages hosted by server system 130.

As another example, video item recommender service 152 operates in online mode where video item recommender service 152 identifies video item recommendations in response to a content request initiated by a user; in other words, the video item recommendations are identified "on-the-fly." The identification and transmission of the video item recommendations to a client device of the user may occur in real-time, such as less than two seconds, or within two hundred milliseconds.

Video item recommender service 152 may cause recommendations for third-party video items ("third-party recommendations") to be displayed, on a screen of a client device, concurrently with recommendations for first-party video items ("first-party recommendations"). In one scenario, third-party recommendations are presented separately from first-party recommendations. For example, third-party recommendations are presented in a first area of a user interface while first-party recommendations are presented in a second area of the user interface that does not overlap the first area. In another scenario, the recommendations for third-party video items are interleaved with the recommendations for first-party video items. For example, between two first-party recommendations is a single third-party recommendation.

In an embodiment, video item recommender service 152 includes, or is communicatively coupled with, first-party video item identifier 154 and third-party video item identifier 156. For example, first-party video item identifier 154 and third-party video item identifier 156 may be part of the same program as video item recommender service 152.

First-Party Video Item Identifier

First-party video item identifier 154 identifies zero or more video items for a particular user. First-party video item identifier 154 may leverage one or more techniques to identify relevant video items for a user. For example, first-party video item identifier 154 implements or uses a model to identify one or more first-party video items for a particular user. The model may be a rule-based model or a machine-learned model. Example features of the model include user features, video item features, and cross features.

Example user features include job title, job function, industry, skills, academic degree(s) earned, academic institution(s) attended, past and current employer(s), current employment status, and specific online activities, such as number of visits to server system 130, number of user selections of past recommendations that were presented to the user, number of video items that the user viewed through server system 130, and average video length of those viewed video items. User feature values may be generated based on retrieving values from the appropriate values in profile data source 158, described in more detail herein.

Example video item features includes video length, industry, category, one or more prerequisite skills, target skills to be acquired by watching the video item, number of past views of the video item, and number of times the video item has been saved by users for future viewing.

Example cross features include whether the industry of the video item and the user match, whether the length of the video item is within a certain range around the average or median length of videos that the user has viewed, whether the video item has been presented to the user in the recent past, whether the user has the prerequisite skills of the video item, whether the use has one or more of the target skills of the video item, and a match score between the user profile of the user and an aggregated viewer profile representing the past viewers of the video item.

Given data about a user and a candidate video item, the model generates output comprising a score that represents how relevant the video item is to the user. Specifically, the score may represent how likely the user is to select a recommendation of the video item, save the video item for later viewing, watch a certain percentage (e.g., 25%) of the video item, and/or perform one or more other downstream actions, which are actions that the user performs relative to server system 130 after being presented with the recommendation. The higher the score, the more likely that the candidate video item is relevant to the user. Thus, the candidate video item is more likely to be presented to the user. Conversely, the lower the score, the less likely that the candidate video item is relevant to the user. Thus, the candidate video item is less likely to be presented to the user.

For example, first-party video item identifier 154 may return a limited number (N) of video item identifiers. Thus, the top N first-party video items are identified as long as their respective scores are higher than a certain threshold. If the number of first-party video items identified is less then N (e.g., due to the relatively low scores or due to the few candidate video items that were considered), then all such identified first-party video items may be returned (e.g., to video item recommender service 152).

Prior to scoring one or more candidate video items for a user, first-party video item identifier 154 may perform some heuristics to quickly identify a candidate set of video items. In this way, first-party video item identifier 154 may avoid using the model to score every first-party video item in first-party data source 132. For example, first-party video item identifier 154 identifies all first-party video items that are in an industry that matches an industry associated with the user. Such industries may be indicated by the user in his/her profile and may be identified automatically by identifying the associated industries of video items previously viewed by the user.

Machine Learning

In an embodiment, one or more machine-learned models upon which first-party video item identifier 154 relies are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users. The statistical model is trained based on multiple attributes (or factors) described herein. In machine learning parlance, such attributes are referred to as "features." To generate and train a statistical model, a set of features is specified and a set of training data is identified.

A training data generator generates training data based on data stored in profile data source 158, first-party data source 134, and/or interaction data source 162. A model trainer trains the model(s) based on the training data using one or more machine learning techniques. Embodiments are not limited to any particular machine learning technique for generating or training the model(s). Example machine learning techniques include linear regression, logistic regression, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

A machine-learned model may output different types of data or values, depending on the input features and the training data. For example, each training instance in the training data comprises a label and multiple feature values, each corresponding to a different feature, such as a user feature, a video item feature, and/or cross features. In order to generate the training data, information about each user-video item pair is retrieved and zero or more operations are applied thereto to compute the different feature values.

The label of each training instance may be whether the corresponding user interacted with the video item in a certain period of time. For example, a label value of '1' indicates that the user selected a recommendation for the video item or viewed video content of the video item, while a label value of '0' indicates that the user did not interact with the video item.

Initially, the number of features that are considered for training may be significant, such as in the hundreds or thousands. After training a machine-learned model and validating the model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. The model trainer (or an administrator) may identify and remove, from the training data, features will little predictive power. Removing such features can speed up the process of training future versions of the model(s) and computing output scores.

Profile Data Source

Profile data source 158 stores multiple entity profiles. Each entity profile in profile data source 134 is provided by a different user. Example entities include users, groups of users, and organizations (e.g., companies, associations, government agencies, etc.). Each entity profile is provided by a different user or group/organization representative. An organization profile may include an organization name, a website, one or more phone numbers, one or more email addresses, one or more mailing addresses, a company size, a logo, one or more photos or images of the organization, an organization size, and a description of the history and/or mission of the organization.

A user profile may include a first name, last name, an email address, residence information, a mailing address, a phone number, one or more educational/academic institutions attended, one or more academic degrees earned, one or more current and/or previous employers, one or more current and/or previous job titles, a list of skills, a list of endorsements, and/or names or identities of friends, contacts, connections of the user, and derived data that is based on actions that the user has taken. Examples of such actions include opportunities (e.g., jobs) to which the user has applied, views of job postings, views of company pages, private messages between the user and other users in the user's connection network, and public messages that the user posted and that are visible to users outside of the user's connection network (but that are registered users/members of the connection network provider).

Some data within a user's profile (e.g., work history) may be provided by the user while other data within the user's profile (e.g., skills and endorsement) may be provided by a third party, such as a "friend," connection, or colleague of the user.

Server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 130 (or another automatic process). For example, a user specifies, in his/her profile, a name of the user's employer. Server system 130 determines, based on the name, where 2 the employer and/or user is located. If the employer has multiple offices, then a location of the user may be inferred based on an IP address associated with the user when the user registered with a social network service (e.g., provided by server system 130) and/or when the user last logged onto the social network service.

Event Logging

Server system 130 may log one or more types of events, with respect to content items (such as video items), across client devices 112-116 (and other client devices not depicted). The events are stored in interaction data source 162. For example, server system 130 determines whether a content item that was delivered to a client device is presented at (e.g., displayed by or played back at) a client device. Such an "event" is referred to as an "impression." As another example, server system 130 determines whether a user interacted with a content item that server system 130 delivered to a client device of the user. Examples of "user interaction" include a view or a selection, such as a "click." Server system 130 stores such data as interaction data, such as an impression data set and/or an interaction data set. Thus, server system 130 include an interaction data source 162. Logging such events allows server system 130 to track how well different content items perform.

For example, server system 130 receives impression data items, each of which is associated with a different instance of an impression and a particular content item. An impression data item may indicate a particular content item (e.g., through a content item identifier), a date of the impression, a time of the impression, a particular publisher or source (e.g., onsite v. offsite), a particular client device that displayed the specific content item (e.g., through a client device identifier), and/or a user identifier of a user that operated the particular client device. Thus, if server system 130 manages delivery of multiple content items, then different impression data items may be associated with different content items. One or more of these individual data items may be encrypted to protect privacy of the end-user.

Similarly, an interaction data item may indicate a particular content item, a date of the user interaction, a time of the user interaction, a particular publisher or source (e.g., onsite v. offsite), a particular client device that displayed the specific content item, and/or a user identifier of a user that operates the particular client device. Thus, each interaction data item associates a user with a content item. An interaction data item may be supplemented with an entity identifier that identifies an entity that created or authored the content item and/or that is referenced in the content item. Such supplementation may be automatically performed at or near the time the interaction data item is created or may be automatically performed sometime later.

If impression data items are generated and processed properly, an interaction data item should be associated with an impression data item that corresponds to the interaction data item. From interaction data items and impression data items associated with a content item, server system 130 may calculate an observed (or actual) user interaction rate (e.g., CTR) for the content item. Also, from interaction data items and impression data items associated with a content provider (e.g., a video item provider), server system 130 may calculate a user interaction rate for the content provider. Additionally, from interaction data items and impression data items associated with a content provider (or content items initiated by the content provider), server system 130 may calculate a user interaction rate for the content provider. Similarly, from interaction data items and impression data items associated with a class or segment of users (or users that satisfy certain criteria, such as users that have a particular job title), server system 130 may calculate a user interaction rate for the class or segment. In fact, a user interaction rate may be calculated along a combination of one or more different user and/or content item attributes or dimensions, such as geography, job title, skills, content provider, certain keywords in content items, etc.

In an embodiment, interaction data items are generated from multiple data sources or verticals, examples of which include content item feed, notifications, news, follows, and search. Each of these verticals allows users to perform actions, such as selecting a content item in a feed, selecting a notification, subscribing to certain news articles, selecting a follow recommendation, selecting a search suggestion, and selecting a search result. Each of these actions may pertain to (or be associated with) an entity. For example, a content item that a user selects may have been created by a particular entity (e.g., a company), a follow recommendation may be to follow content produced by a university, and a subscription may be to news articles that reference a government agency.

Third-Party Video Item Identifier

Third-party video item identifier 156 identifies zero or more third-party video items given a first-party video item. In other words, for each first-party video item that first-party video item identifier 154 identifies, third-party video item identifier 156 identifies zero or more third-party video items using video item pair data source 148. Thus, video item recommender service 152 may invoke third-party video item identifier 156 for each first-party video item identified by first-party video item identifier 154. Alternatively, video item recommender service 152 invokes third-party video item identifier 156 once and may send multiple video item identifiers (identified by first-party video item identifier 154) to third-party video item identifier 156. Alternatively, first-party video item identifier 154 may invoke third-party video item identifier 156 for each first-party video item that it identifies.

Ranking Third-Party Video Items

Video item recommender service 152 (or another component of server system 130, such as third-party video item identifier 156) ranks third-party video items. The ranking may be performed based on one or more criteria, such as creation date of the third-party video item, number of views of the third-party video item, number of saves of the third-party video item, number of requests of the third-party video item, an aggregated rating by users of the third-party video item, an aggregated rating by users of the first-party video item with which the third-party video item is related, and the similarity measure of the third-party video item with the corresponding first-party video item(s). For example, the third-party video items with the top M highest similarity measures are selected. M may be a pre-defined value that limits the number of third-party video items that may be recommended. Also, M may be a function of the number (N) of first-party video items that are recommended. For example, the greater the value of N, the lesser the value of M and vice versa. Alternatively, N and M may be fixed values.

In some scenarios, third-party video item identifier 156 identifies the same third-party video item for multiple first-party video items. For example, for a particular user, first-party video item identifier 154 identifies 1PA, 1PB, and 1PC, and, based on those video items, third-party video item identifier 156 identifies 3PA for 1PA, 3PB and 3PC for 1PB, and 3PA and 3PD for 1PC. Thus, third-party video item identifier 156 identifies 3PA for 1PA and for 1PC. A computed score for that particular third-party video item (i.e., 3PA in this example) may be based on combining the similarity measures of 3PA relative to 1PA and 1PC. For example, the mean or median is calculated from the similarity measures, (the median being calculated in scenarios where a third-party video item identifier is identified more than two times for different first-party video items).

In an embodiment, the fact that a third-party video item matches multiple first-party video items that have been identified for a particular user is a factor in ranking the third-party video item relative to other third-party video items. For example, even though the similarity measures between a particular third-party video item and multiple first-party video items is less than a single similarity measure between another third-party video item and the same or different first-party video item, the particular third-party video item may be ranked higher.

Multiple Groups: One for Each Embedding

In an embodiment, video item group generator 142 generates multiple sets of groups, one group set for each embedding generated for a video item. For example, each video item may have a minimum of a title and a description. Thus, embedding generator 136 generates a title embedding and a description embedding for each video item. Then, video item group generator 142 generates (1) a first set of groups based on title embeddings and (2) a second set of groups based on description embeddings.

As a result, two mappings may be generated for a pair of video items: one mapping generated based on a similarity between respective title embeddings and another mapping generated based on a similarity between respective description embeddings.

In an embodiment, the fact that a particular third-party video item matches a first-party video item multiple times based on multiple embeddings is a factor in ranking the particular third-party video item relative to other third-party video items. For example, even though the similarity measures of a particular third-party video item relative to a particular first-party video item are lower relative to a single similarity measure between another third-party video item and the same or different first-party video item, the particular third-party video item is ranked higher relative to the other third-party video item.

Multiple Groups for Better Coverage

In an embodiment, video item group generator 142 generates multiple sets of groups, each group set based on the same embedding. A reason for generating multiple sets of groups is to generate more accurate mappings. While generating multiple sets of groups based on third-party data source 132 takes longer than generating a single group set, doing so increases the accuracy of the resulting mappings. Group generation techniques such as k-means clustering and LSH are non-deterministic. Therefore, the "central" embeddings associated with a first group set may be very different than the central embeddings associated a second group set. Thus, matching a first-party video item to each group in a first group set may result in a different set of mappings than what would result from matching that same first-party video item to each group in a second group set, even though both group sets are based on the same third-party video items (e.g., from third-party data source 132).

Top N Groups for Better Coverage

The multi-dimensional space occupied by embeddings of a group of video items is not regular. Due to the nature of group generation techniques, it is possible that a third-party video item is assigned to a particular group that is not selected for a first-party video item even though that third-party video item may be sufficiently similar to the first-party video item, or even more similar than any third-party video item in the selected group. Because the particular group is not selected for the first-party video item, a similarity measure will never be generated for the two video items and, therefore, there is no chance for the third-party video item to be associated with the first-party video item.

In an embodiment, instead of selecting the group associated with the highest group score (or similarity score), video item pair generator 146 selects the top N groups associated with the highest group score, where N is greater than one. Then, video item pair generator 146 searches the third-party video items assigned to each of the N groups to determine whether any of those third-party video items is sufficiently similar to an input first-party video item. While searching more groups takes more time and computing resources than searching a single group, the probability that the most relevant third-party video items are identified for a given first-party video item increases, resulting in potentially more relevant third-party recommendations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
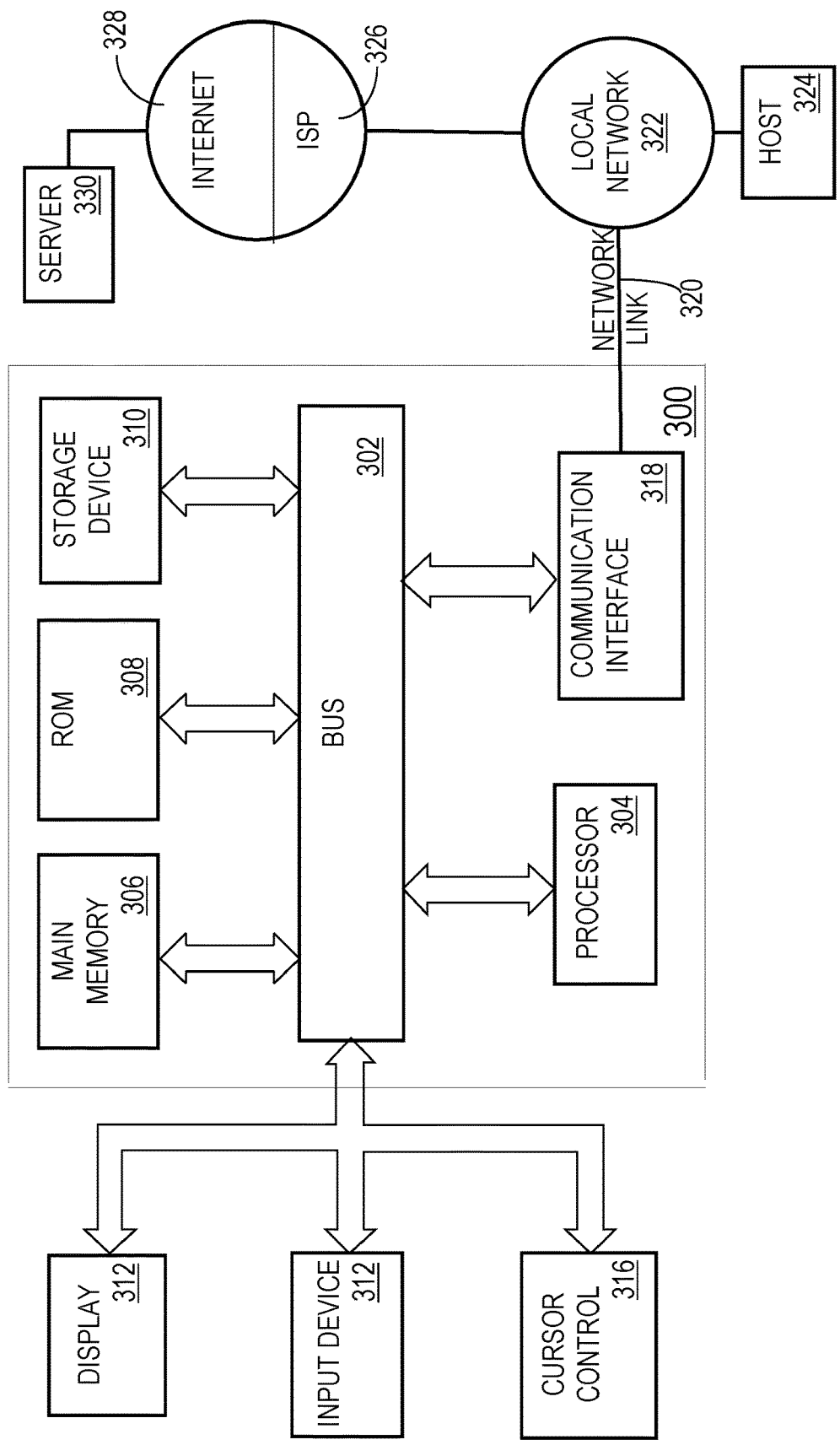
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

identifying a first plurality of video items;

identifying metadata of each video item in the first plurality of video items;

by inserting the metadata of each video item into a machine-learned embedding generator, generating an embedding for each video item in the first plurality of video items;

generating a plurality of groups of the first plurality of video items, wherein each video item in the first plurality of video items is assigned to a group in the plurality of groups based on the embedding generated for said each video item;

identifying a second plurality of video items;

generating an embedding for each video item in the second plurality of video items;

for each particular video item in the second plurality of video items:
for each group of the plurality of groups;
comparing the embedding of said each particular video item with an embedding associated with said each group to generate a group score;
adding the group score to a set of group scores;
identifying a particular group, in the plurality of groups, that is associated with the highest group score in the set of group scores;
for each video item in the particular group:
comparing the embedding of said each particular video item with an embedding associated with said each video item in the particular group to generate a video pair score;
adding the video pair score to a set of video pair scores;
based on the set of video pair scores, storing a mapping that associates said each particular video item with one or more video items in the particular group;
adding the mapping to a set of mappings;
wherein the method is performed by one or more computing devices.

2. The method of claim 1, wherein generating the plurality of groups comprises using a k-means clustering technique to generate the plurality of groups.

3. The method of claim 1, further comprising:
identifying, for a particular user, a subset of the second plurality of video items;
for each video item in the subset:
identifying said each video item in a particular mapping in the set of mappings;
based on the particular mapping, identifying one or more video items in the first plurality of video items;
adding the one or more video items to a set of video items;
causing first data about each video item in the set of video items to be presented on a computing device of the particular user.

4. The method of claim 3, further comprising:
causing second data about each video item in the subset to be presented on the computing device of the particular user.

5. The method of claim 3, wherein identifying, for the particular user, the subset of the second plurality of video items, comprises:
identifying a first plurality of attribute values of the particular user;
for each video item in a second subset of the second plurality of video items:
identifying a second plurality of attribute values of said each video item;
generating a plurality of feature values based on the first plurality of attribute values and the second plurality of attribute values;
inputting the plurality of feature values into a machine-learned model to generate a user-item pair score;
adding the user-item pair score to a set of user-item pair scores;
selecting the subset from the second subset based on the set of user-item pair scores.

6. The method of claim 1, wherein the embedding generated for each video item in the first plurality of video items is a first embedding, wherein the plurality of groups is a first plurality of groups, the method further comprising:
generating a second embedding for each video item in the first plurality of video items;
generating a second plurality of groups of the first plurality of video items, wherein each video item in the second plurality of video items is assigned to a group in the second plurality of groups based on the second embedding generated for said each video item.

7. The method of claim 6, wherein the first embedding of each video item in the first plurality of video items is a title of said each video item and the second embedding of each video item in the first plurality of video items is a description of said each video item.

8. The method of claim 1, wherein the plurality of groups is a first plurality of groups, further comprising:
generating a second plurality of groups of the first plurality of video items, wherein each video item in the second plurality of video items is assigned to a group in the second plurality of groups based on the embedding generated for said each video item;
identifying the second plurality of video items;
for each particular video item in the second plurality of video items:
for each particular group of the second plurality of groups;
comparing the embedding of said each particular video item with an embedding associated with said each particular group to generate a second group score;
adding the second group score to a second set of group scores;
identifying a second particular group, in the second plurality of groups, that is associated with the highest group score in the second set of group scores;
for each video item in the second particular group:
comparing the embedding of said each particular video item with an embedding associated with said each video item in the second particular group to generate a second video pair score;
adding the second video pair score to a second set of video pair scores;
based on the second set of video pair scores, storing a second mapping that associates said each particular video item with one or more video items in the second particular group;
adding the second mapping to a second set of mappings.

9. The method of claim 1, wherein:
identifying the particular group that is associated with the highest group score in the set of group scores comprises identifying two or more groups, in the plurality of groups, that are associated with the highest group scores in the set of group scores;
the particular group is a first group in the two or more groups that includes the first group and a second group;
the method further comprising:
for each video item in the second group:
comparing the embedding of said each particular video item, in the second plurality of video items, with an embedding associated with said each video item in the second group to generate a second video pair score;
adding the second video pair score to a second set of video pair scores;
based on the second set of video pair scores, storing a second mapping that associates said each particular video item, in the second plurality of video items, with one or more video items in the second group;
adding the second mapping to a second set of mappings.

10. The method of claim 1, wherein:
each video item in the second plurality of video items is associated with values for a set of metadata attributes;
each video item in the first plurality of video items is not associated with values for the set of metadata attributes.

11. One or more storage media storing instructions which, when executed by one or more processors, cause:
identifying a first plurality of video items;
identifying metadata of each video item in the first plurality of video items;
by inserting the metadata of each video item into a machine-learned embedding generator, generating an embedding for each video item in the first plurality of video items;
generating a plurality of groups of the first plurality of video items, wherein each video item in the first plurality of video items is assigned to a group in the plurality of groups based on the embedding generated for said each video item;
identifying a second plurality of video items;
generating an embedding for each video item in the second plurality of video items;
for each particular video item in the second plurality of video items:
for each group of the plurality of groups;
comparing the embedding of said each particular video item with an embedding associated with said each group to generate a group score;
adding the group score to a set of group scores;
identifying a particular group, in the plurality of groups, that is associated with the highest group score in the set of group scores;
for each video item in the particular group:
comparing the embedding of said each particular video item with an embedding associated with said each video item in the particular group to generate a video pair score;
adding the video pair score to a set of video pair scores;
based on the set of video pair scores, storing a mapping that associates said each particular video item with one or more video items in the particular group;
adding the mapping to a set of mappings.

12. The one or more storage media of claim 11, wherein generating the plurality of groups comprises using a k-means clustering technique to generate the plurality of groups.

13. The one or more storage media of claim 11, wherein the instructions, when executed by the one or more processors, further cause:
identifying, for a particular user, a subset of the second plurality of video items;
for each video item in the subset:
identifying said each video item in a particular mapping in the set of mappings;
based on the particular mapping, identifying one or more video items in the first plurality of video items;
adding the one or more video items to a set of video items;
causing first data about each video item in the set of video items to be presented on a computing device of the particular user.

14. The one or more storage media of claim 13, wherein the instructions, when executed by the one or more processors, further cause:
causing second data about each video item in the subset to be presented on the computing device of the particular user.

15. The one or more storage media of claim 13, wherein identifying, for the particular user, the subset of the second plurality of video items, comprises:
identifying a first plurality of attribute values of the particular user;
for each video item in a second subset of the second plurality of video items:
identifying a second plurality of attribute values of said each video item;
generating a plurality of feature values based on the first plurality of attribute values and the second plurality of attribute values;
inputting the plurality of feature values into a machine-learned model to generate a user-item pair score;
adding the user-item pair score to a set of user-item pair scores;
selecting the subset from the second subset based on the set of user-item pair scores.

16. The one or more storage media of claim 11, wherein the embedding generated for each video item in the first plurality of video items is a first embedding, wherein the plurality of groups is a first plurality of groups, wherein the instructions, when executed by the one or more processors, further cause:
generating a second embedding for each video item in the first plurality of video items;
generating a second plurality of groups of the first plurality of video items, wherein each video item in the second plurality of video items is assigned to a group in the second plurality of groups based on the second embedding generated for said each video item.

17. The one or more storage media of claim 16, wherein the first embedding of each video item in the first plurality of video items is a title of said each video item and the second embedding of each video item in the first plurality of video items is a description of said each video item.

18. The one or more storage media of claim 11, wherein:
each video item in the second plurality of video items is associated with values for a set of metadata attributes;
each video item in the first plurality of video items is not associated with values for the set of metadata attributes.

* * * * *